US012608386B2

(12) United States Patent
Hirsch et al.

(10) Patent No.: US 12,608,386 B2
(45) **Date of Patent: \*Apr. 21, 2026**

(54) ENTITY MATCHING WITH MACHINE LEARNING FUZZY LOGIC

(71) Applicant: Palantir Technologies Inc., Denver, CO (US)

(72) Inventors: Elliot Hirsch, New York, NY (US); Johannes Beil, Copenhagen (DK); Lauren Brown, London (GB); Nicolas Prettejohn, Bath (GB); Paul Baseotto, Poole (GB); Shaul Walter, Tel Aviv (IL)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,385

(22) Filed: Sep. 9, 2024

(65) Prior Publication Data

US 2024/0427783 A1    Dec. 26, 2024

Related U.S. Application Data

(63) Continuation of application No. 18/333,975, filed on Jun. 13, 2023, now Pat. No. 12,111,839, which is a
(Continued)

(51) Int. Cl.
| | |
|---|---|
| *G06F 7/00* | (2006.01) |
| *G06F 16/2458* | (2019.01) |
| *G06F 16/248* | (2019.01) |

(52) U.S. Cl.
CPC ........ *G06F 16/2468* (2019.01); *G06F 16/248* (2019.01)

(58) Field of Classification Search
CPC .. G06F 16/243; G06F 16/248; G06F 16/2468; G06F 16/35; G06F 16/215; G06F 16/285; G06F 16/9038; G06F 16/9535; G06F 16/9558; G06F 16/9537; G06F 16/90332; G06F 16/9044; G06F 16/2456;
(Continued)

(56) References Cited

U.S. PATENT DOCUMENTS

| | | | | |
|---|---|---|---|---|
| 10,838,987 B1 * | 11/2020 | Edwards | ............... | G06F 16/288 |
| 11,113,255 B2 | 9/2021 | Faruquie | | |

(Continued)

OTHER PUBLICATIONS

U.S. Pat. No. 11,720,580, Entity Matching With Machine Learning Fuzzy Logic, Aug. 8, 2023.
(Continued)

*Primary Examiner* — Mohammad A Sana

(74) *Attorney, Agent, or Firm* — Knobbe, Martens, Olson & Bear, LLP

(57) ABSTRACT

A fuzzy matching system matching data records in one or more data sets based on user-customized selection of multiple fuzzy matching algorithms. Possible matches may be displayed to a user, who provides feedback on the accuracy of the matches, which may then be used by a machine learning algorithm to update weightings and parameters of the multiple fuzzy matching algorithms, such as based on machine learning analysis of the matching results and the user feedback.

20 Claims, 9 Drawing Sheets

Related U.S. Application Data continuation of application No. 17/683,986, filed on Mar. 1, 2022, now Pat. No. 11,720,580.

(60) Provisional application No. 63/156,524, filed on Mar. 4, 2021.

(58) Field of Classification Search

CPC ............. G06F 16/3326; G06F 16/3349; G06F 16/3344; G06F 16/958; G06N 20/00; G06N 5/04; G06N 3/0475; G06N 3/0455; G06N 3/044; G06N 3/045

See application file for complete search history.

(56) References Cited

U.S. PATENT DOCUMENTS

| | | | |
|---|---|---|---|
| 11,403,329 B2 * | 8/2022 | Edwards | G06F 16/288 |
| 11,720,580 B1 | 8/2023 | Fintoc et al. | |
| 12,111,839 B1 * | 10/2024 | Hirsch | G06F 16/248 |
| 2002/0198875 A1 | 12/2002 | Masters | |
| 2008/0027930 A1 | 1/2008 | Bohannon | |
| 2014/0101172 A1 * | 4/2014 | Dua | G06Q 10/10 |
| | | | 707/750 |
| 2017/0103110 A1 * | 4/2017 | Winstanley | G06F 16/334 |
| 2021/0304121 A1 * | 9/2021 | Lee | G06F 40/284 |
| 2021/0334275 A1 * | 10/2021 | Smart | G06F 16/2456 |
| 2022/0237182 A1 * | 7/2022 | Silavong | G06F 16/334 |

OTHER PUBLICATIONS

U.S. Appl. No. 18/333,975, Entity Matching With Machine Learning Fuzzy Logic, filed Jun. 13, 2023.

* cited by examiner

360

Additional Configurations      ⊞ Modify Advanced Configs

| | |
|---|---|
| Max Cluster Size | 50 |
| Custom Elements | algo.clean_tokens |
| Probability Cutoff | 50 |

Advanced Method Settings      123 Modify Similarity Score

| | Method Name | Enforced Similarity Score |
|---|---|---|
| ☑ | Levenshtein | low |
| ☑ | Trigram | low |
| ☐ | User Defined | low |
| ☐ | Soundex | high |
| ☐ | Phrase | medium |
| ☐ | Exact | medium |

| | First_Entity_ID | Second_Entity_ID | Email_Levensht... | Email_Levensht... | Email_Levensht... | Email_Trigram | Age_Exact_Mat | Address_Standard Token | Address_Rare_Low |
|---|---|---|---|---|---|---|---|---|---|
| 1 | 0011072105cb73b66c392 | 1012b8071a3b01630eaf | 0 | 0 | 0 | 0 | 1 | 0 | 0 |
| 2 | 0011072105cb73b66c392 | bcce45be9594c64c63c245 | 0 | 0 | 0 | 0 | 0 | 0 | 0 |
| 3 | 001bd9d983385ba6b04a6 | 0feb2649704c6a1bd4adoc | 0 | 0 | 0 | 0 | 0 | 0.38 | 0.6 |
| 4 | 001bd9d983385ba6b04a6 | 104c3b5453a23806eb671c | 0 | 0 | 0 | 0 | 0 | 0 | 0 |
| 5 | 001bd9d983385ba6b04a6 | 20c32958673f6c92eae | 0 | 0 | 0 | 0 | 1 | 0.38 | 0.6 |
| 6 | 001bd9d983385ba6b04a6 | 22209a1e4b71c87d09090 | 0 | 0 | 0 | 0.4 | 0 | 0 | 0 |
| 7 | 001bd9d983385ba6b04a6 | 251c87bd23a13b9a9cc05 | 0 | 0 | 0 | 0 | 0 | 0 | 0 |
| 8 | 001bd9d983385ba6b04a6 | 3940f6cfb6003850f987c7 | 0 | 0 | 0 | 0 | 0 | 0 | 0 |
| 9 | 001bd9d983385ba6b04a6 | 3c49dcadec435aab3523d | 0 | 0 | 0 | 0 | 0 | 0.38 | 0.6 |
| 10 | 001bd9d983385ba6b04a6 | 48b82b902fab1796eb1406 | 0 | 0 | 0 | 0 | 1 | 0.38 | 0.6 |
| 11 | 001bd9d983385ba6b04a6 | 4d5a7ecb4efeb9bf467c0 | 0 | 0 | 0 | 0 | 0 | 0.38 | 0.6 |
| 12 | 001bd9d983385ba6b04a6 | 50277e7716d259a0b7615 | 0 | 0 | 0 | 0 | 0 | 0 | 0 |
| 13 | 001bd9d983385ba6b04a6 | 550fc40e4481b449792c4 | 0 | 0 | 0 | 0 | 0 | 0.38 | 0.6 |
| 14 | 001bd9d983385ba6b04a6 | 5a72932e0d3b8143568b | 0 | 0 | 0 | 0 | 0 | 0.38 | 0.6 |
| 15 | 001bd9d983385ba6b04a6 | 60b7e1c706d216420568d4 | 0 | 0 | 0 | 0 | 0 | 0.38 | 0.6 |
| 16 | 001bd9d983385ba6b04a6 | 618bcda34a6d4150df309 | 0 | 0 | 0 | 0 | 0 | 0 | 0 |

ENTITY MATCHING WITH MACHINE LEARNING FUZZY LOGIC

INCORPORATION BY REFERENCE TO ANY PRIORITY APPLICATIONS

This application is a continuation of U.S. patent application Ser. No. 18/333,975, filed Jun. 13, 2023, titled "ENTITY MATCHING WITH MACHINE LEARNING FUZZY LOGIC", which is a continuation of U.S. patent application Ser. No. 17/683,986, filed on Mar. 1, 2022, titled "ENTITY MATCHING WITH MACHINE LEARNING FUZZY LOGIC", now U.S. Pat. No. 11,720,580, which claims benefit of U.S. Provisional Patent Application No. 63/156,524, filed Mar. 4, 2021, and titled "ENTITY MATCHING WITH MACHINE LEARNING FUZZY LOGIC." The entire disclosure of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, the present disclosure relates to improved systems and methods for employing multiple types of matching logic to improve confidence levels of candidate pairs actually being a match.

BACKGROUND

With the increase in electronic data that is generated to represent activities in all aspects of our lives, the ability to identify data that corresponds with a same entity becomes increasingly difficult.

SUMMARY

Embodiments of the present disclosure describe systems and methods for identifying matching entities in one or more entity lists based on user-customized selection of multiple fuzzy matching algorithms. Possible matches may be displayed to a user, who provides feedback on the accuracy of the matches, which may then be used by a machine learning algorithm to update weightings and parameters of the multiple fuzzy matching algorithms. For example, embodiments disclosed herein may identify information in transactions that might be indicative of some risk. For example, data items associated with particular phrases, names, etc. might be indicators of risk, so identifying as many data items that are associated with those same particular phrases, names, etc., across multiple data sets may increase accuracy of risk estimations. Matching data items should be identified even if there are spelling mistakes, different spellings, multiple languages, among the data items.

It has been noted that design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the aboveand/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 3B illustrates an example user interface that may be used to customize a matching rule.

FIG. 5 is an example of a portion of a matching data table that stores results of execution of multiple matching algorithms against user selected data sets.

DETAILED DESCRIPTION

Overview

Figure 1:
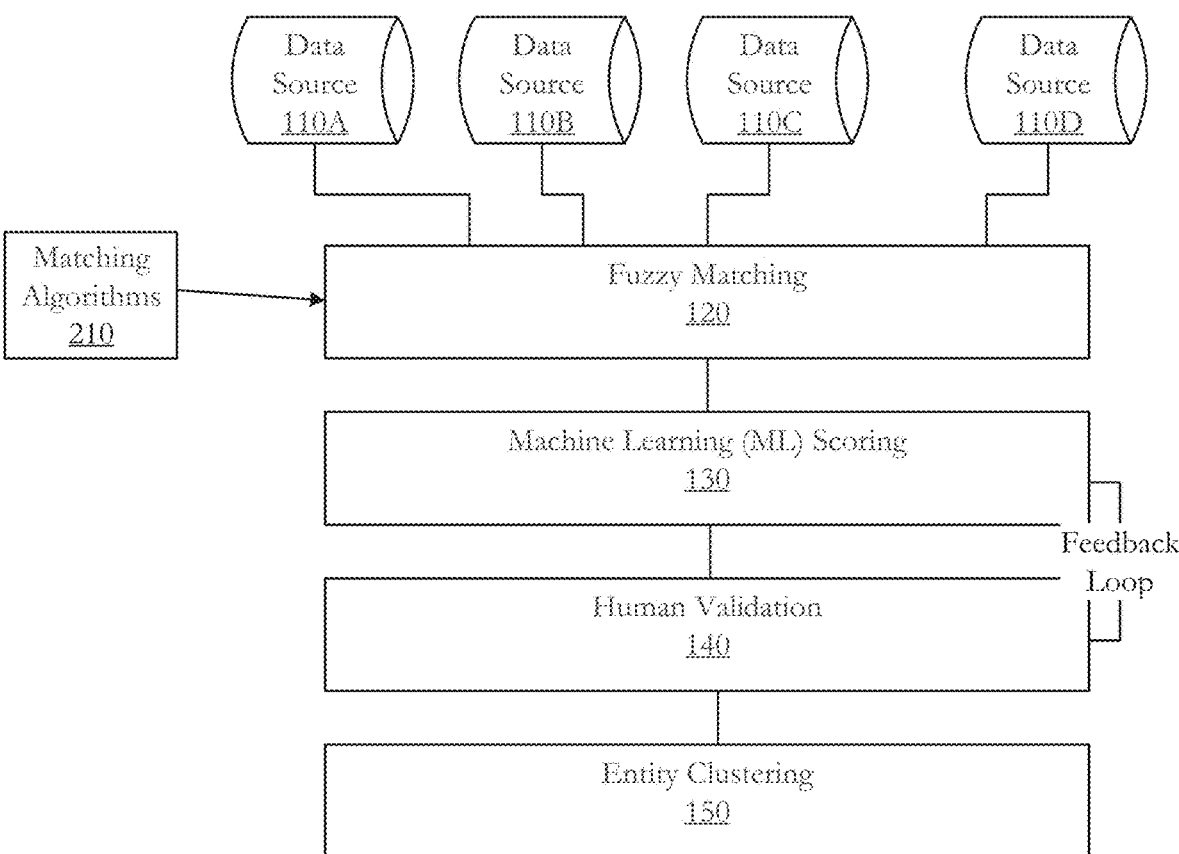
FIG. 1 is a flow diagram illustrating one embodiment of process of identifying matching data items and performing entity clustering based on the matches.

Embodiments of the present disclosure relate to a fuzzy matching system that may be configured, e.g., by a user, to apply multiple matching algorithms to one or more data sets to identify potential matching data items.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, extendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Item (Item), Data Object (Object), or Data Entity (Entity): A data container for information representing specific things in the world that have a number of definable properties. For example, a data entity may represent an entity such as a person, a place, an organization, an account, a computer, an activity, a market instrument, or other noun. A data item may represent an event that happens at a point in time or for a duration, such as data associated with a financial transaction. A data item may represent a document or other unstructured data source such as an e-mail message, a news report, or a written paper or article. Each data item may be associated with a unique identifier that uniquely identifies the data item. The data item's attributes (for example, metadata about the data entity) may be represented in one or more properties. The terms "data entity," "data object," and "data item" may be used interchangeably and/or synonymously in the present disclosure.

Item (or Object or Entity) Type: Type of a data item (for example, Person, Event, or Document). Data item types may be defined by an ontology and may be modified or updated to include additional data entity types. An data item definition (for example, in an ontology) may include how the data item is related to other data items, such as being a sub-data entity type of another data item type (for example, an agent may be a sub-data entity of a person data entity type), and the properties the data item type may have.

Properties: Also referred to as "metadata," includes attributes of a data entity. At a minimum, each property of a data item has a property type and a value or values. Properties/metadata associated with data entities may include any information relevant to that data item. For example, properties associated with a person data item may include a name (for example, John Doe), an address (for example, 123 S. Orange Street), and/or a phone number (for example, 800-0000), among other properties. In another example, properties associated with a transaction data item may include a transferer name, receiver name, amount, bank account number, etc., among other properties.

Property Type: The type of data that is represented by a corresponding property value. For example, a table of data items may include column headers indicating property types (e.g., name, identifier, address, etc.) and each row of the table may include property values of the type indicated in the corresponding column header.

Property Value: The value associated with a property, which is of the type indicated in the property type associated with the property. A property may have multiple values. For example, a transaction data item may include a property value of 123523 for a property type of Account Number.

Matching Algorithm or Matching Model: logic that may be used to identify possible or actual matches between two or more data items, such as between two records in a database or table storing data regarding financial transaction data associated with various entities (e.g., individuals or groups of individuals). Matching algorithms may compare various property values of data items to determine a likelihood of the two data items being associated with a same entity, for example. Matching algorithms may include, but are not limited to, token matching (e.g., for order-agnostic matching), substring searches (e.g., finding the sub-string 'Texas' in the phrase 'Texas Shipping Company'), trigram, edit-distance (e.g., for spelling errors and typos", metaphone (e.g., for homophones), term frequency model (e.g., for weighing tokens differently based on frequency in corpus, initialization weighting (e.g., for abbreviated entities or initialized names), phrase matching (e.g., for spacing-agnostic fuzzy matching), and/or any other matching logic, algorithm, or model.

Example System Overview

FIG. 1 is a flow diagram illustrating one embodiment of process of identifying matching data items and performing entity clustering based on the matches. In the example of FIG. 1, multiple data sources 110 (including 110A, 110B, 110C, 110D, and any other quantity of data sources) are in communication with a fuzzy matching system 120 (or simply "matching system" or "system"). As discussed further below, the fuzzy matching system 120 may evaluate pairs of data items in one or more data sets (e.g., data records, such as rows in a table) for matches, such as based on multiple matching algorithms 210 (see FIG. 2). The matching algorithms 210 may include various matching techniques, such as token matching, metaphone, trigram, and the like. The fuzzy matching system 120 may advantageously resolve matches between distinct internal data sets (e.g., from a common data source), between an internal data set and an external data set (e.g., from two different data sources), within a single data set (e.g., form a single internal or external data source), or any other combination of one or more data sets and/or data sources.

In the example of FIG. 1, an output of the fuzzy matching system 120 is received by a machine learning scoring component 130, which is generally configured to estimate the likelihood of pairs of data records being matches based on match scores from the various matching algorithms employed by the fuzzy matching system 120. In some embodiments, the machine learning model is trained to identify matches, such as based on a set of test data that includes indications of positive record matches (where the user has previously confirmed that the two records are each associated with a same entity) and negative record matches (e.g., a pair of records where the user has previously confirmed that the two entities are not a match). Thus, the machine learning model may be pre-trained to identify matches, and may be updated using feedback from the user as discussed herein to improve upon the matching accuracy.

In some embodiments, indications of matching pairs of data records are provided for human validation 140, such as via display of the candidate pair of data records in a user interface to a reviewer, and receiving feedback regarding accuracy of the candidate pair being provided by the user. This feedback is provided to the machine learning scoring component 130, and the feedback may be used to update and improve the logic used by the scoring model to better identify matches in future. For example, the feedback from the user may be used to help the machine learning model improve candidate pair suggestions that decrease false positives and increase true positives.

In the example of FIG. 1, an entity clustering component 150 receives the results of human validated matches and generates clusters of matching data records, such as may be displayed for user interaction and stored in an ontological database. For example, data records that are each associated with a same individual (e.g., based on similarities of property values of similar properties in each of the data records) may be clustered. In some implementations, the match outcomes of individual matching algorithms are transparent to the user so that decisions on which matching algorithms should be used for future entity resolution tasks may be optimized. For example, if a particular matching algorithm is not relied upon for any true matches, but requires significant processing resources, a user may decide to exclude that particular matching algorithm for future similar entity resolution jobs.

Figure 2:
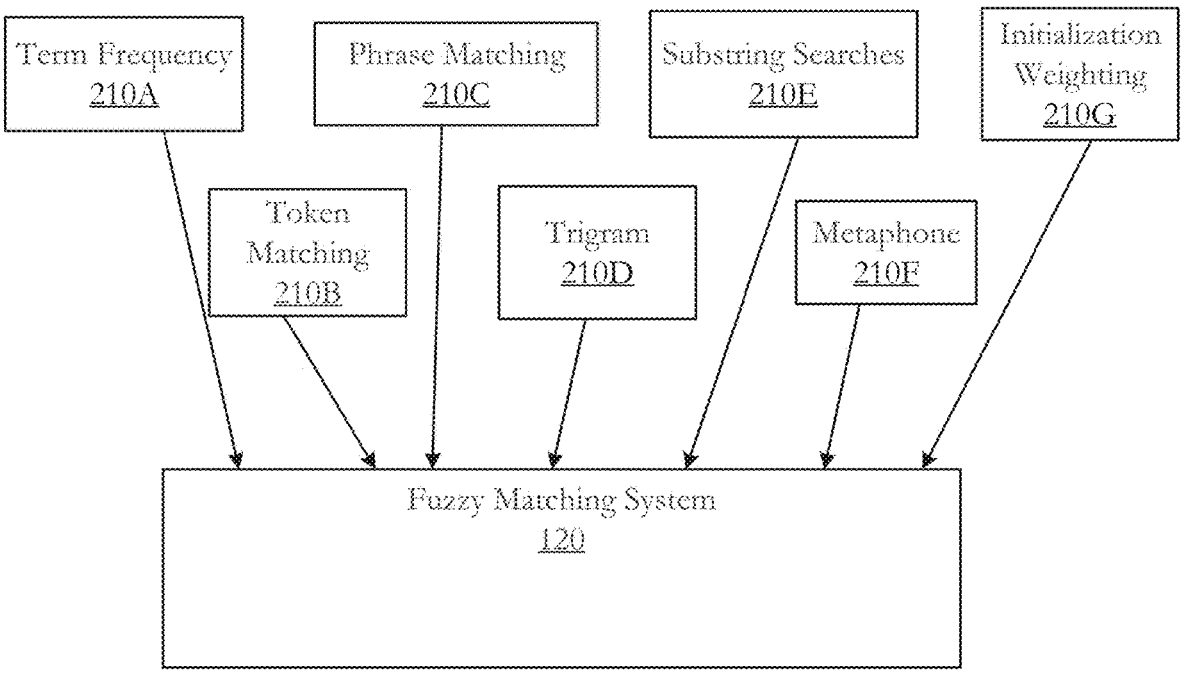
FIG. 2 is a block diagram illustrating an example of several matching algorithms that may be used by the fuzzy matching system to evaluate likelihood of a match between data records from one or more data sets.

FIG. 2 is a block diagram illustrating an example of several matching algorithms 210 that may be used by the fuzzy matching system 120 to evaluate likelihood of a match between data records from one or more data sets. In some embodiments, each of the seven illustrated matching algorithms 210A-210F may be used to identify likely matches, and may each generate a match score for pairs of data records. However, in other embodiments, any quantity of the matching algorithms 210, such as two, three, four, etc. of the matching algorithms 210 may be used for a particular entity resolution job. Furthermore, in some embodiments additional matching algorithms 210 that are not shown may be used in a particular entity resolution job. In some embodiments, a user of the fuzzy matching system 120 selects parameters for any of the fuzzy matching algorithms 210 that are selected.

Example Entity Resolution Configuration

Figure 3A:
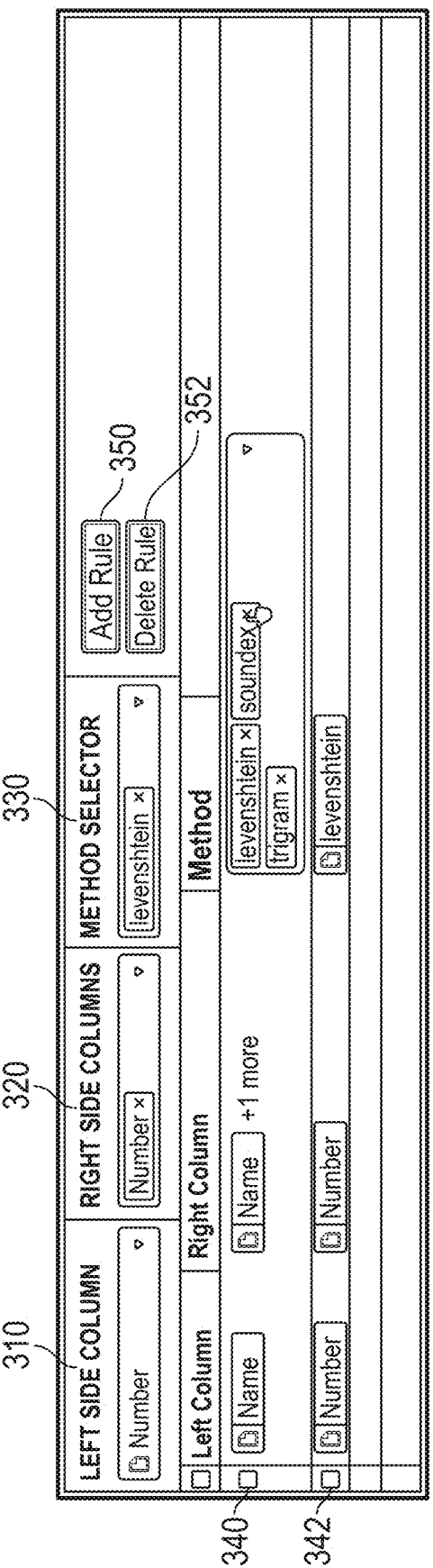
FIG. 3A is an example user interface that allows a user to configure an entity resolution job, e.g., a process of identifying candidate pairs of matching data records using a user-customized set of matching algorithms.

FIG. 3A is an example user interface that allows a user to configure an entity resolution job, e.g., a process of identifying candidate pairs of matching data records using a user-customized set of matching algorithms. In this example, the user interface allows selection of a first property type 310 (e.g., a first column of a data set), a second property type 320 (e.g., a second column of a data set), and a matching method selector 330. Depending on the matching job, such as the type of data records, the first and second property types may both refer to a same property within a single data source, or they may refer to similarly named property types in separate data sets. For example, for a de-duplication job, the first and second property types may be the same, e.g., a name data type within data records from a single data set. In an implementation where data records from two different data sets are to be matched, the first property type 310 may refer to a particular property type within a first data source and the second property type 320 may refer to a particular property type within a second data source.

The method selector 330 allows the user to select one or more matching algorithms to be used in evaluating pairs of property values from the first and second property types of data records. In the example of FIG. 3A, a first matching rule 340 indicates that the name attribute (e.g., a "name" property type) of pairs of data records are evaluated using Levenshtein, Soundex, and trigram matching algorithms, and a second matching rule 342 indicates that the number attribute of pairs of data records are evaluated using a Levenshtein matching algorithm. Additional matching rules may be added using the add rule button 350, and existing rules may be removed using the 352.

FIG. 3B illustrates an example user interface that may be used to customize a matching rule. For example, a particular matching algorithm selected in method selector 330 (FIG. 3A) may be customized using the user interface 360 of FIG. 3B. In this example, the user can select a maximum cluster size, custom elements, and a probability cut off for the selected matching algorithms. Additionally, in this example each of the matching algorithms may be customized to require either a low, medium, or high level of similarity before indicating a likely match between two data records. In other embodiments, other aspects of the matching algorithms may be similarly customized in this manner.

Figure 4:
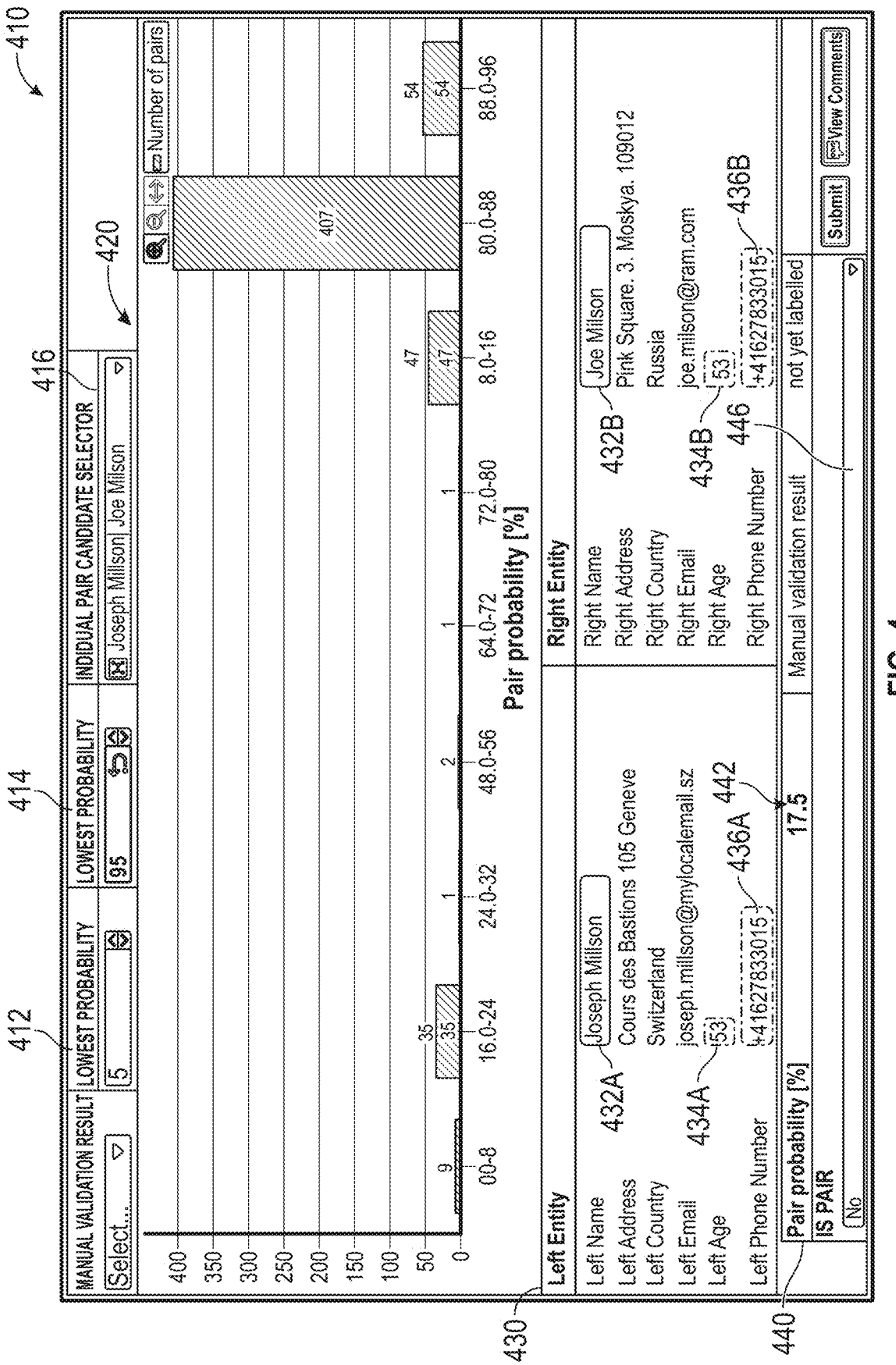
FIG. 4 is an example user interface illustrating results of an entity resolution process, such as based on the matching rules established in the example of FIG. 3A.

FIG. 4 is an example user interface 410 illustrating results of an entity resolution process, such as based on the matching rules established in the example of FIG. 3A. In this example embodiment, the user is provided the option to provide a low threshold 412 and a high threshold 414 for limiting display of matching candidate pairs. In this example, the user has indicated that matches with a probability between 5%-95% should be displayed. With that probability filter applied, the histogram 420 indicates how many matching pairs are in each of several probability ranges, with the largest number of matches (e.g., 407) being in the 80-88% probability range.

A match comparison pane 430 provides details regarding a particular candidate match. For example, the user may select an individual pair candidate using selector 416 to initiate display of details regarding the candidate pair in pane 430. In some embodiments, a highest probability match may initially be displayed in the match comparison pane 430 and/or a matching pair may be selected in any other manner. Depending on the implementation, details regarding the separate matching algorithms applied to the candidate pair may be indicated such as using different colors, highlighting, or other visual effects to note those attributes (e.g., property types and corresponding property values) that contributed to (or against) the possible match determination. For example, the candidate pair displayed in pane 430 includes name attributes 432A, 432B that are not an exact match and so may be displayed with a first visual effect, e.g., a red background and text color. However, the age attributes 434A, 434B and phone number attributes 436A, 436B are an exact match and may be displayed with a second visual effect, e.g., a green background and text color.

In the example of FIG. 4, a user feedback pane 440 allows a user to provide feedback on accuracy of the candidate pair currently displayed in pane 430. In this example, the user can select options from a drop-down 446, such as "Yes" or "No", or values along a scale (e.g., 0-5) in some embodiments, to indicate whether the user believes the candidate pairs are a match (e.g., are associated with a same single entity). As noted elsewhere, the user feedback advantageously may be used to update an overall match scoring algorithm and/or provide feedback to the user regarding which matching algorithms may be more beneficial to increase accuracy in identifying candidate pairs in similar data sets. The user feedback pane 440 also indicates an overall pair probability 442 representative of a weighted aggregation of outcomes of the multiple matching algorithms and corresponding matching rules that were applied to the candidate pair, which is 17.5% in this example.

FIG. 5 is an example of a portion of a matching data table 500 that stores results of execution of multiple matching algorithms against user selected data sets. In this example, a candidate pair column 502 includes a value that is unique for each row of the table, and each row generally is associated with a pair of candidate data records. Thus, in the portion of the data table 500 included in FIG. 5, sixteen combinations of data records are indicated in the sixteen rows. In this example, a first entity ID column 504 indicates a unique identifier for a first data record of the candidate pair and a second entity ID column 506 indicates a unique identifier for a second data record of the candidate pair. Depending on the implementation, the number of columns in such a table, where each column may indicate a matching score for a particular matching algorithm based on property values of the candidate pair of data records, may include tens, hundreds, thousands, or more columns. In the portion of the data table 500 illustrated in FIG. 5, columns 508, 510, and 512 indicate matching scores for variations of a Levenshtein algorithm on email attributes of the candidate pair, column 514 indicates a trigram score for email addresses of the candidate pair, column 516 indicates matching scores for exact matches of age attributes of the candidate pair, and columns 518 and 520 include matching scores for standard token and rare low matching algorithms on address attributes of the candidate pair.

In some embodiments, all available matching algorithms are executed on a selected first and second data set, with the matching scores stored in a table similar to illustrated in FIG. 5. Then, in response to a user selecting a particular subset of the matching algorithms to be used for a particular job, matching scores from the table may be extracted and aggregated, such as by an overall match algorithm, to provide low latency matching results to the user.

Figure 6:
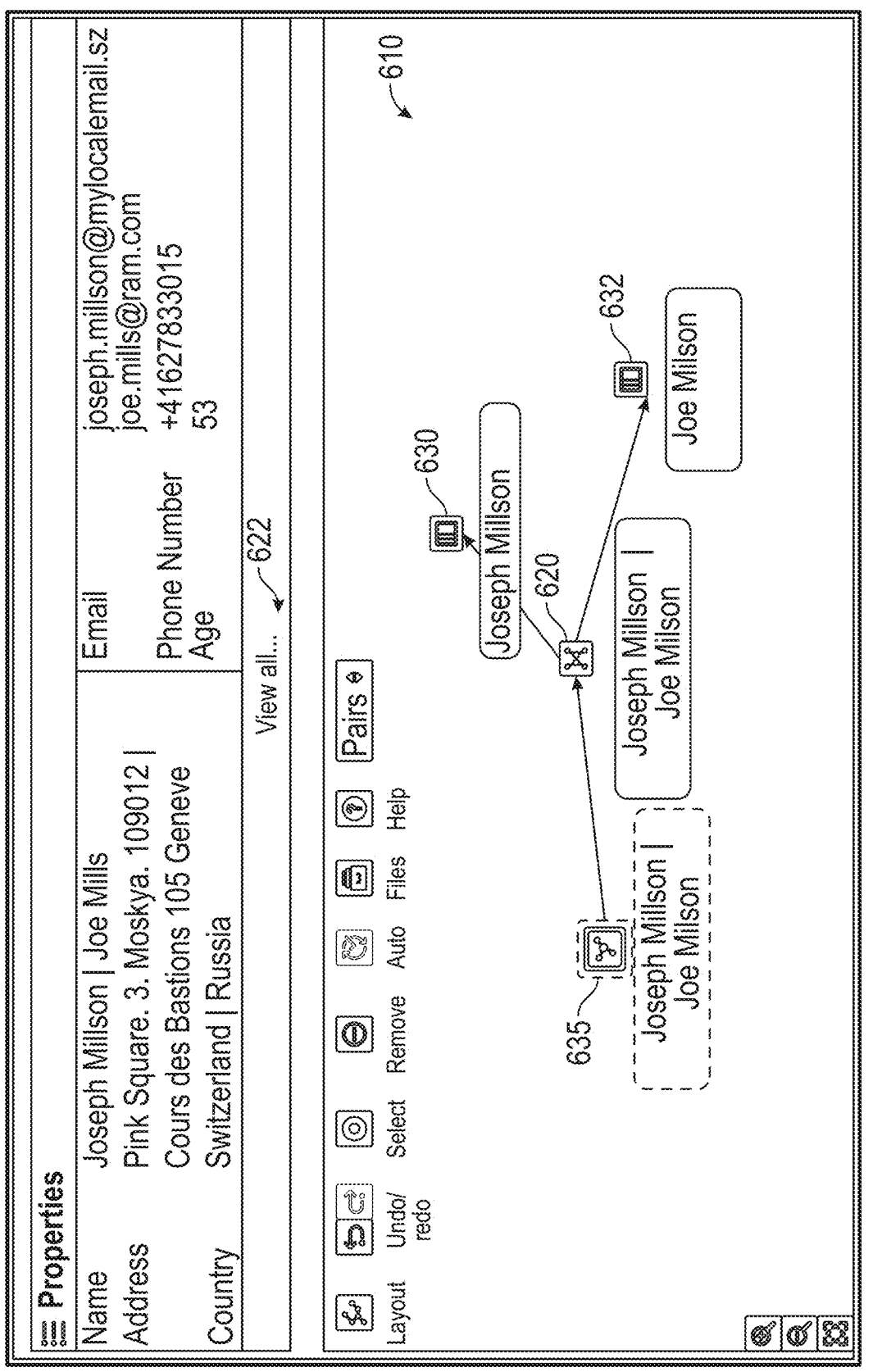
FIG. 6 is an example user interface that may be used to depict candidate pairs and allow the user to provide feedback regarding accuracy of the candidate pairs.

FIG. 6 is an example user interface that may be used to depict candidate pairs and allow the user to provide feedback regarding accuracy of the candidate pairs. In this example visualization 610, a candidate pair icon 620 is displayed connected to two entity records 630, 632. This linkage indicates that each of the entity records 630, 632 may be associated with a same individual, represented by entity icon 635. In this example, details regarding the displayed candidate entities are provided in detail pane 620, with an option to view further information regarding the two entities by selecting a view all link 622. In some embodiments, selecting a candidate pair icon, such as icon 620, causes a pair validation window 710 (FIG. 7) to appear, wherein the user can provide feedback regarding accuracy of the candidate pair.

Figure 7:
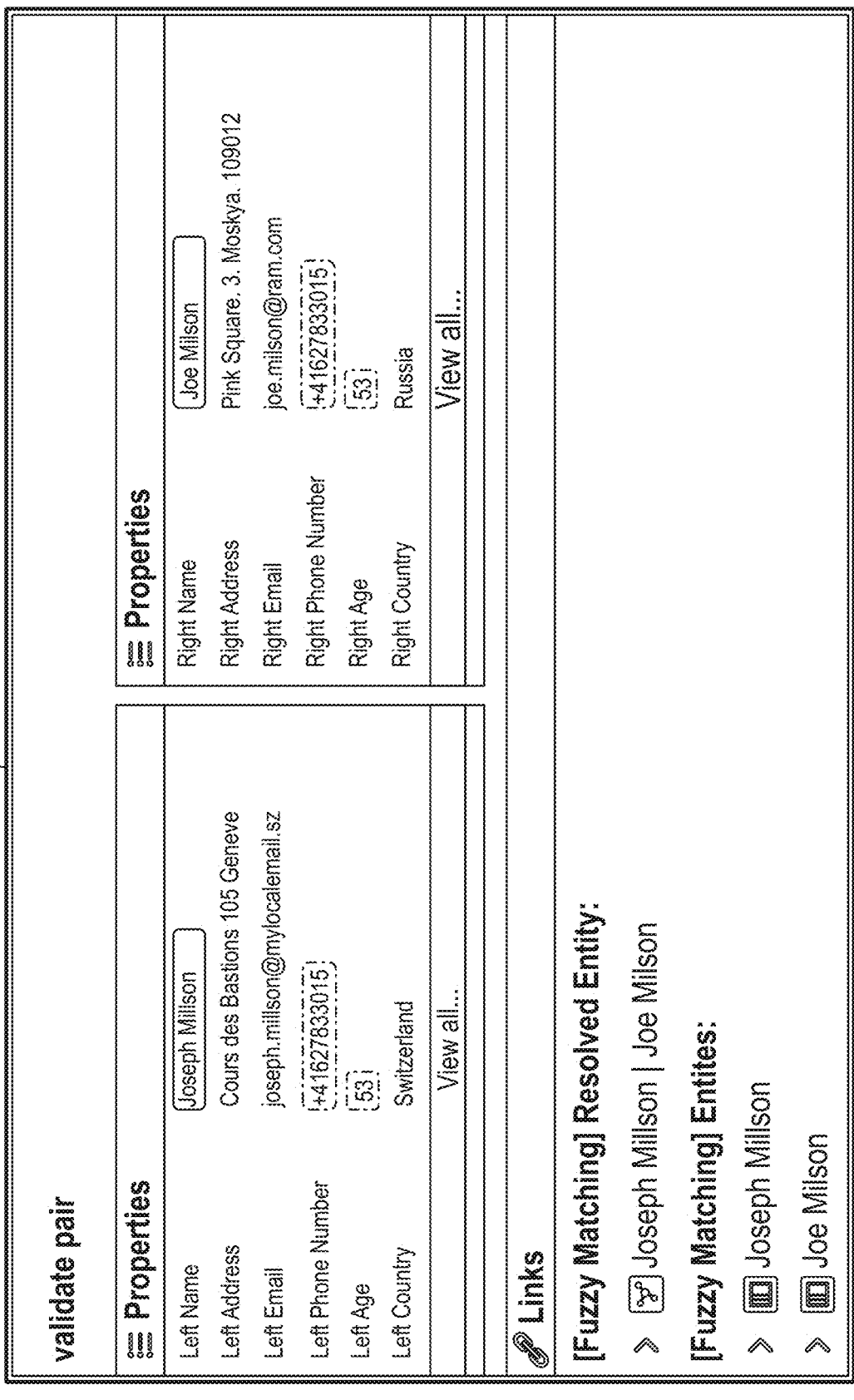
FIG. 7 is an example user interface wherein a user can provide feedback regarding accuracy of the candidate pair.

With reference to FIG. 7, the validate pair user interface 710 may provide visual indications of portions of the candidate entities that are associated with a match score indicative of a match (e.g., the phone number and age attributes in the example of FIG. 7) and/or match scores that are not indicative of a match (e.g., the name attributes in the example of FIG. 7). In some embodiments, if the user indicates that the candidate pair is not a match, the pair is not included in future matching jobs. Additionally, the machine learning scoring component 130 (FIG. 1) may update weightings and/or other characteristics of a scoring algorithm based on the user feedback.

Figure 8:
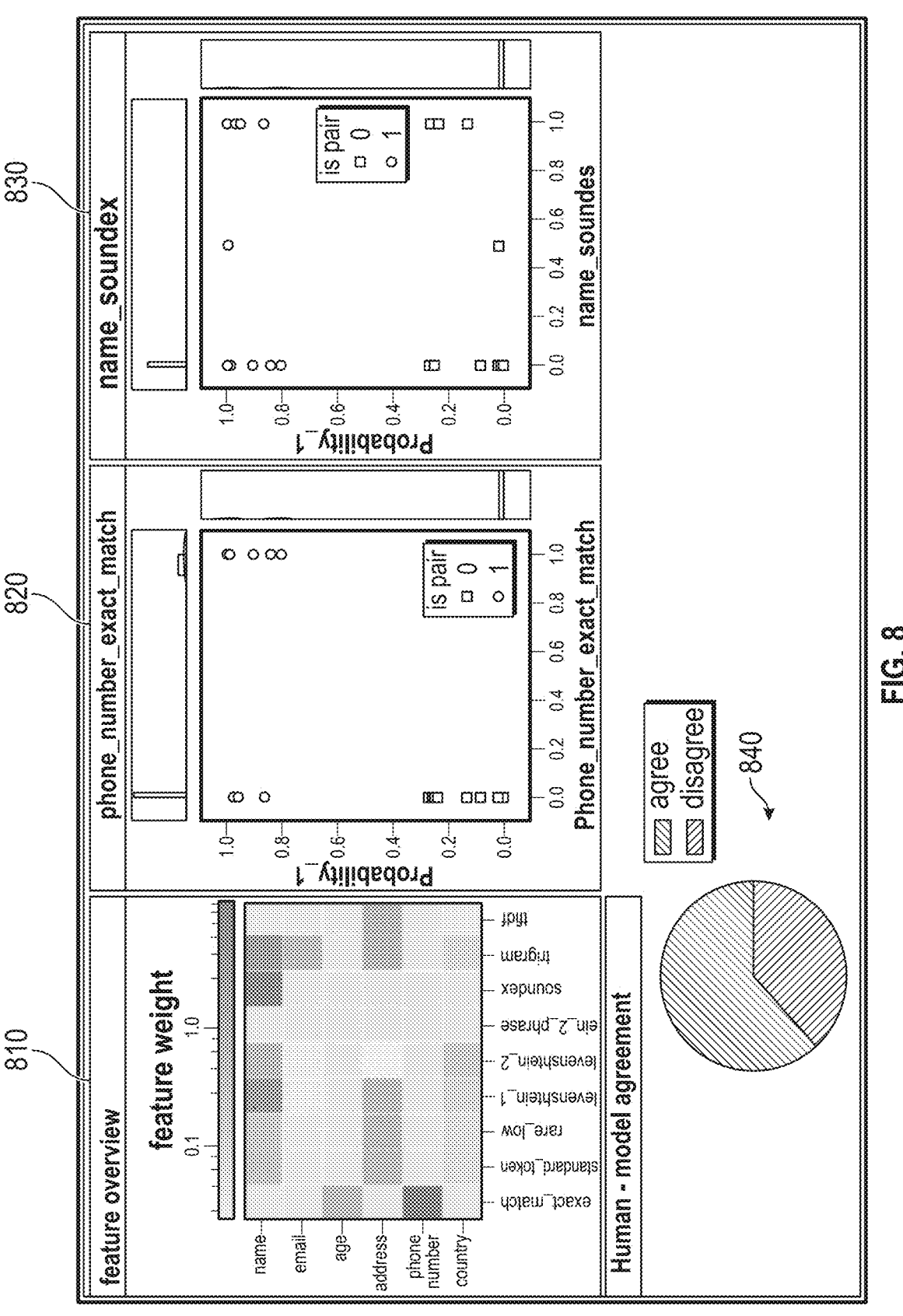
FIG. 8 is an example user interface including a few example visualizations that may be provided to the user to illustrate various effectiveness parameters of matching rules and matching algorithms.

FIG. 8 is an example user interface including a few example visualizations that may be provided to the user to illustrate various effectiveness parameters of matching rules and matching algorithms. A feature overview visualization 810 indicates attributes on the vertical axis and matching algorithms on the horizontal axis. Thus, the intersection of each attribute and matching algorithm provides an indicator of how heavily weighted that particular combination currently is in the overall scoring algorithm. In this example, the phone number exact_match has a highest weighting, while Levenshtein_2 matching algorithm applied to address attributes has one of the lower weightings. The example of FIG. 8 also includes a phone number exact match visualization 820 and a name_Soundex visualization 830. These visualizations indicate the correlation between the particular matching algorithm probabilities and the overall match scores. The user may apply changes to the matching algorithms or matching rules (e.g., including multiple matching algorithms applied to particular attributes) based on information provided in these visualizations.

A model agreement visualization 840 indicates portions of the candidate pair recommendations provided by the overall scoring algorithm that are confirmed by human feedback. In particular, the "agree" slice of the pie chart 840 indicates that approximately 60% of the candidate pair recommendations were confirmed as matches by the human feedback. As the feedback is analyzed and used in updating the overall scoring algorithms, the size of the agreement slice of the pie chart 840 should increase.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the fore-going appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated oth-erwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments nec-essarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more pro-cessors should not be interpreted as excluding other com-puter components, and may possibly include such compo-nents as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing descrip-tion. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the com-puting system to perform the computerized method com-prising:

for each individual property of a plurality of properties that is included in each of a first data record and a second data record:
determining, based at least on an output from a machine learning model, a matching algorithm of a plurality of matching algorithms associated with the indi-vidual property; and
executing the determined matching algorithm on prop-erty values for the individual property in each of the first and second data records to generate a match score;
wherein a first matching algorithm of the plurality of matching algorithms is associated with a first indi-vidual property and a second matching algorithm of the plurality of matching algorithms is associated with a second individual property;
determining an overall match score for the first and second data records based on at least some of the match scores associated with individual properties; and
outputting at least the overall match score.

2. The computerized method of claim 1, wherein the machine learning model is configured to analyze historical match results to generate the output.

3. The computerized method of claim 1, wherein the machine learning model is configured to adjust one or more of weightings or parameters of matching algorithms.

4. The computerized method of claim 1, wherein the overall match score is determined based on a machine learning model.

5. The computerized method of claim 1, further comprising:

estimating likelihood of the first and second data records being matches based on application of a machine learning model to at least some of the match scores.

6. The computerized method of claim 1, wherein the overall match score is determined based on weightings associated with respective matching algorithms, wherein the weightings are indicative of relative weights of particular matching algorithms in calculating the overall match score.

7. The computerized method of claim 6, further comprising:

determining accuracy of the overall match score; and updating one or more of the weightings associated with matching algorithms based on the determined accuracy.

8. The computerized method of claim 7, wherein said updating is based on machine learning analysis of the weightings.

9. The computerized method of claim 1, wherein the first data record is selected from a first data set and the second data record is selected from a second data set.

10. The computerized method of claim 9, wherein the first data set and the second data set are the same data set.

11. The computerized method of claim 1, wherein the properties include one or more of name, address, phone number, email address, citizenship, identification code, account number, or transaction amount.

12. A computing system comprising:

a hardware computer processor; and a non-transitory computer readable medium having software instructions stored thereon, the software instructions executable by the hardware computer processor to cause the computing system to perform operations comprising:

for each individual property of a plurality of properties that is included in each of a first data record and a second data record:

determining, based at least on an output from a machine learning model, a matching algorithm of a plurality of matching algorithms associated with the individual property; and executing the determined matching algorithm on the property values for the individual property in each of the first and second data records to generate a match score;

wherein a first matching algorithm of the plurality of matching algorithms is associated with a first individual property and a second matching algorithm of the plurality of matching algorithms is associated with a second individual property;

determining an overall match score for the first and second data records based on at least some of the match scores associated with individual properties; and outputting at least the overall match score.

13. The computing system of claim 12, wherein the machine learning model is configured to analyze historical match results to generate the output.

14. The computing system of claim 12, wherein the machine learning model is configured to adjust one or more of weightings or parameters of matching algorithms.

15. The computing system of claim 12, wherein the overall match score is determined based on a machine learning model.

16. The computing system of claim 12, the operations further comprising:

estimating likelihood of the first and second data records being matches based on application of a machine learning model to at least some of the match scores.

17. The computing system of claim 12, wherein the overall match score is determined based on weightings associated with respective matching algorithms, wherein the weightings are indicative of relative weights of particular matching algorithms in calculating the overall match score.

18. The computing system of claim 17, further comprising:

determining accuracy of the overall match score; and updating one or more of the weightings associated with matching algorithms based on the determined accuracy.

19. The computing system of claim 18, wherein said updating is based on machine learning analysis of the weightings.

20. The computing system of claim 12, wherein the first data record is selected from a first data set and the second data record is selected from a second data set.

* * * * *